O. M. TAYLOR.
MACHINE FOR FILLING CAPSULES.
APPLICATION FILED FEB. 5, 1917. RENEWED MAR. 18, 1918.

1,280,585.

Patented Oct. 1, 1918
5 SHEETS—SHEET 3.

WITNESSES:

INVENTOR
Oscar M. Taylor
BY
ATTORNEY

O. M. TAYLOR.
MACHINE FOR FILLING CAPSULES.
APPLICATION FILED FEB. 5, 1917. RENEWED MAR. 18, 1918.
1,280,585.
Patented Oct. 1, 1918.
5 SHEETS—SHEET 4.
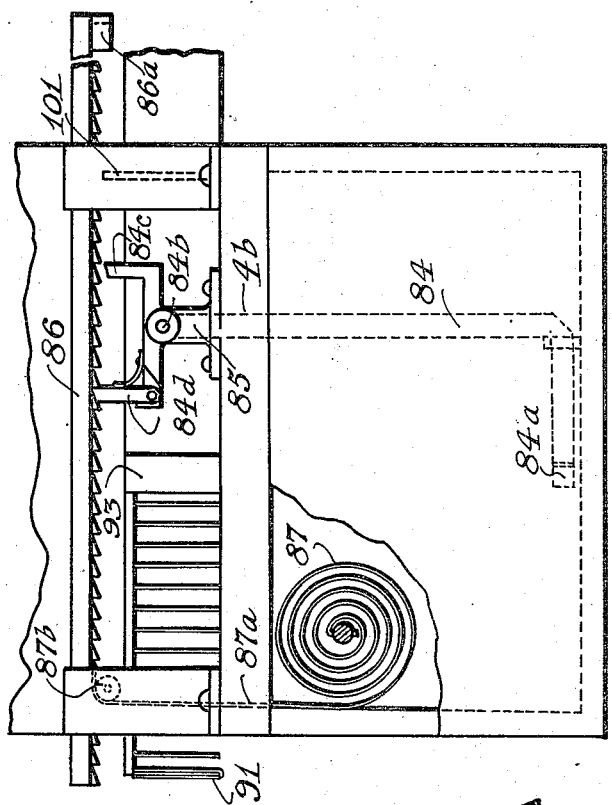
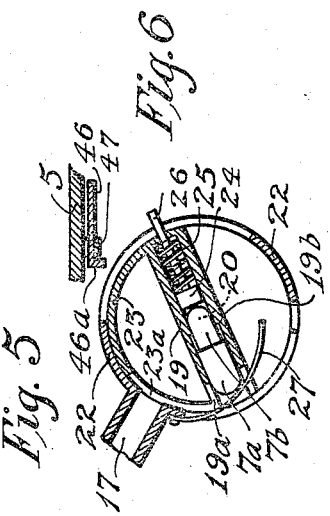
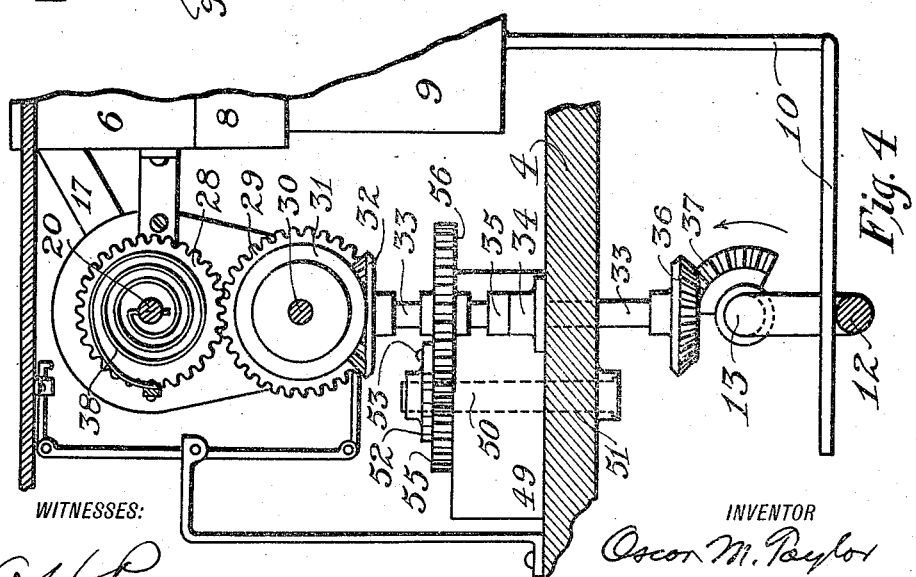
WITNESSES:
INVENTOR
Oscar M. Taylor
BY
J H Weatherford
ATTORNEY

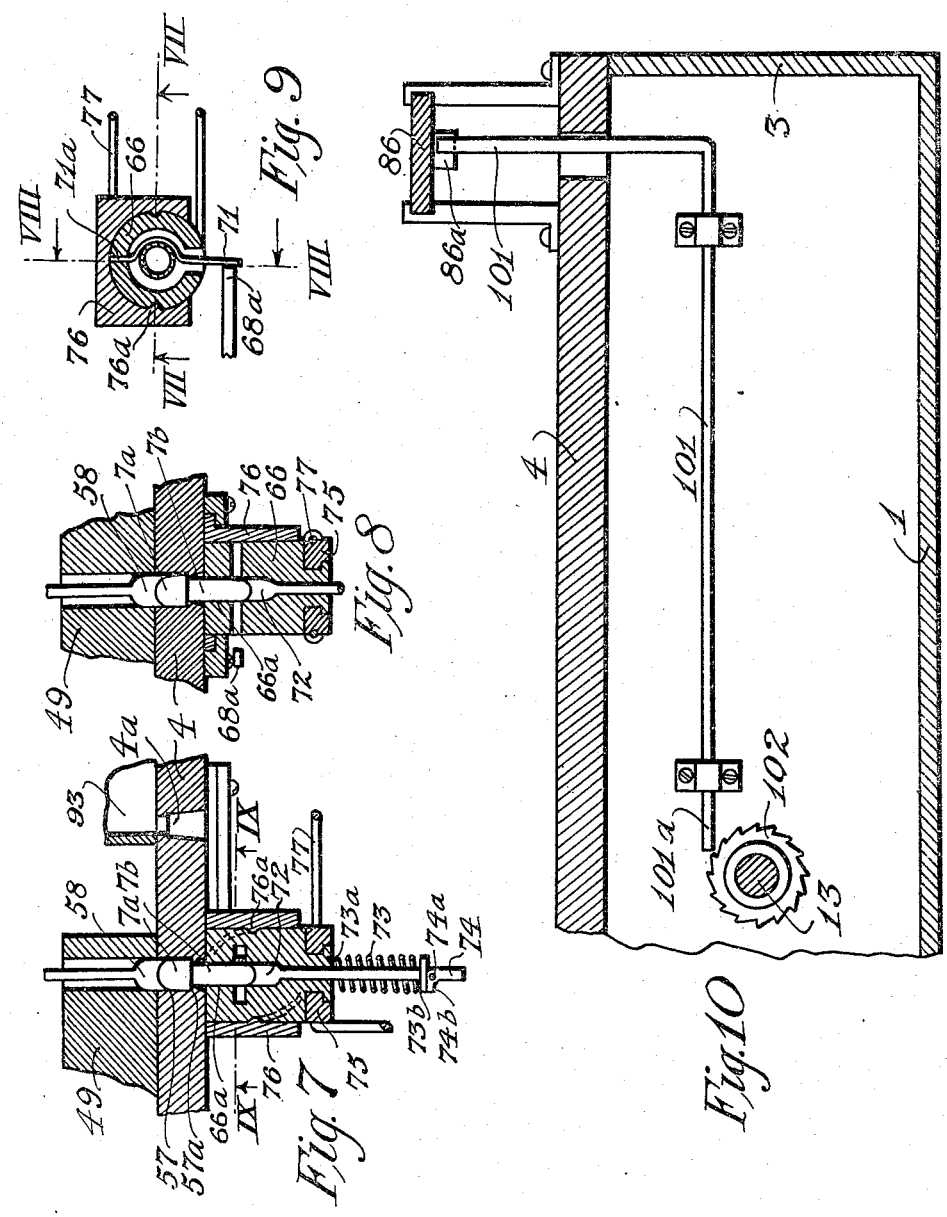

UNITED STATES PATENT OFFICE.

OSCAR M. TAYLOR, OF MEMPHIS, TENNESSEE, ASSIGNOR OF ONE-HALF TO DAVID S. GARDNER, OF MEMPHIS, TENNESSEE.

MACHINE FOR FILLING CAPSULES.

1,280,585.  Specification of Letters Patent.  Patented Oct. 1, 1918.

Application filed February 5, 1917, Serial No. 146,594. Renewed March 18, 1918. Serial No. 223,252.

*To all whom it may concern:*

Be it known that I, OSCAR M. TAYLOR, a citizen of the United States, residing at Memphis, in the county of Shelby and State of Tennessee, have invented certain new and useful Improvements in Machines for Filling Capsules, of which the following is a full, clear, and exact description, such as will enable others skilled in the art to make and use the same.

My invention relates to improvements in machines for measuring the powder or other substance to be put into the capsule and for decapping, filling and recapping the capsules, in which machine the empty capsules are placed promiscuously in a suitable hopper and are then automatically fed one by one to a separating device where the bodies of the capsules are successively withdrawn from their respective caps and are automatically filled with the premeasured powder or other substance and afterward reinserted into their respective caps, and delivered into a suitable receptacle.

The objects of my invention are to provide a machine which will perform these operations automatically in a simple, expeditious and reliable manner. I accomplish these objects as will be more fully hereinafter set forth in the drawings, specification and claims.

In the drawings—

Fig. 4 is a fragmentary sectional side elevation taken on the line IV—IV of Figs. 2 and 3 and diametrically opposed to Fig. 1 to show certain details of the operating mechanism.

Fig. 5 is a partial end elevation taken in the direction of the arrow V Figs. 1 and 2 with a portion of the case broken away.

Fig. 6 is a detail view of the capsule inverter.

Fig. 7 is a vertical section on the line VII—VII of Fig. 9 showing details of the decapping mechanism, and Fig. 8 is a similar section on the line VIII—VIII of Fig. 9.

Fig. 9 is a horizontal section of the same detail taken on the line IX—IX of Fig. 7 and Fig. 10 a vertical section on the line X—X of Fig. 2.

Figure 1:
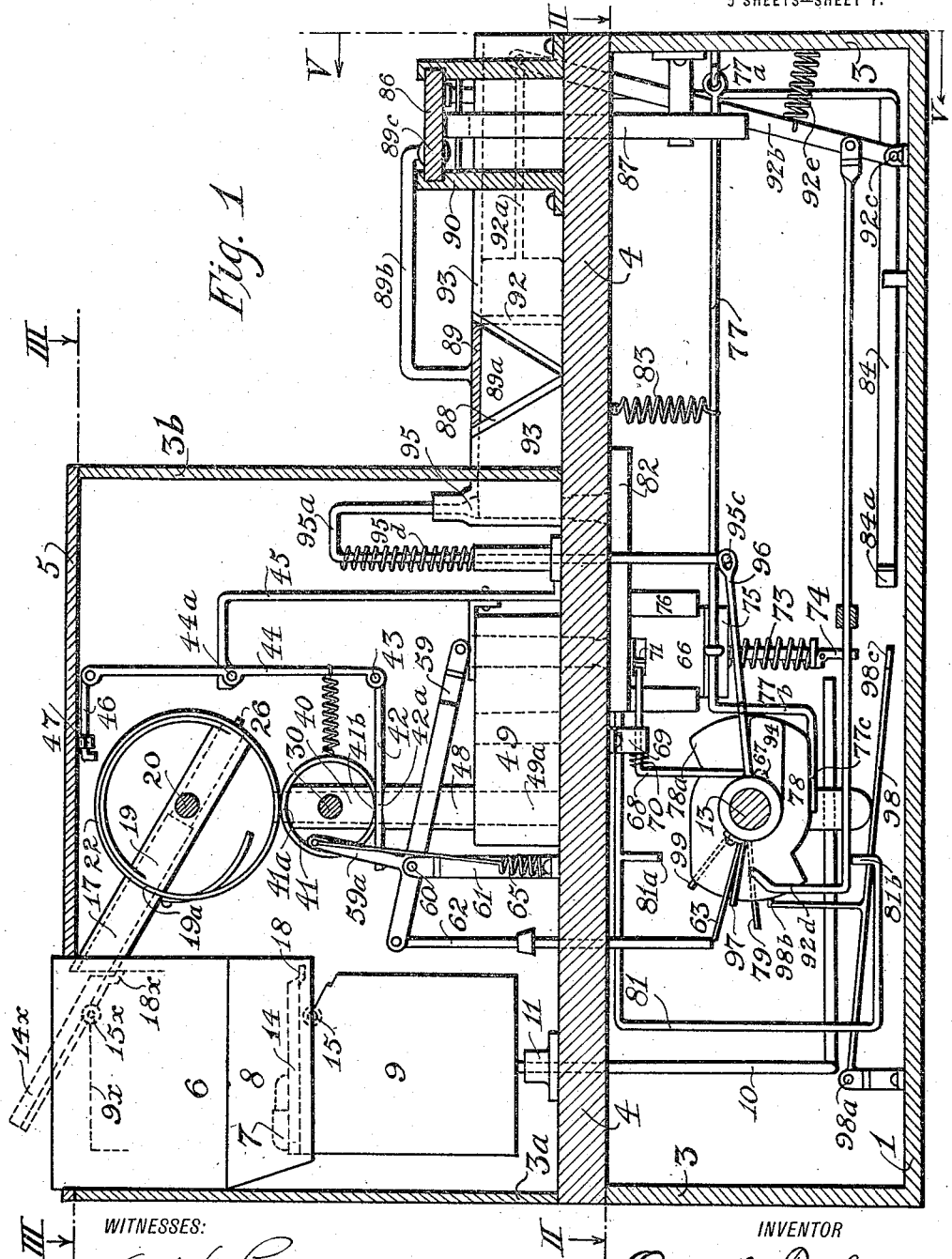
Figure 1 is a sectional side elevation taken on the line I—I of Figs. 2 and 3 looking in the direction of the arrows.
Figure 2:
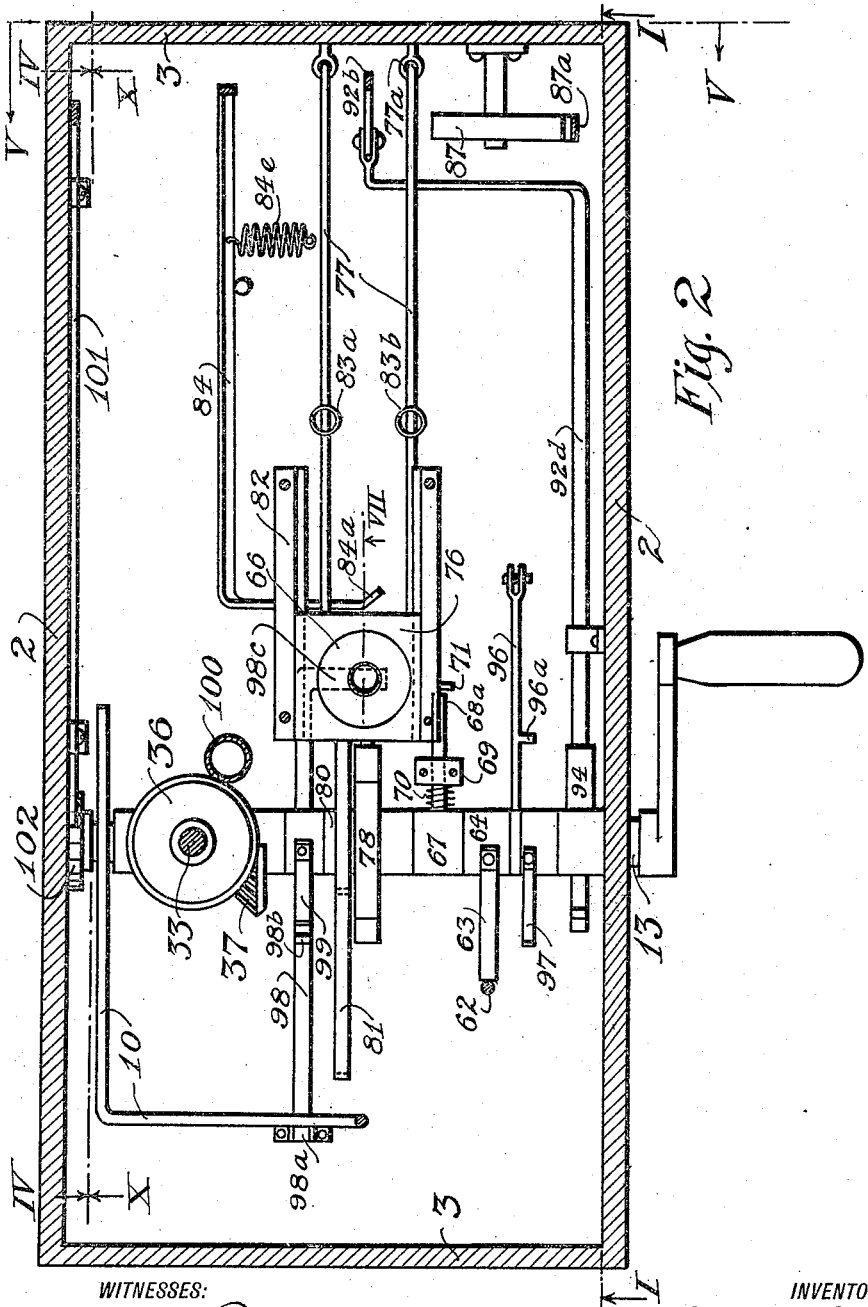
Fig. 2 is a sectional plan taken on the line II—II of Fig. 1.
Figure 3:
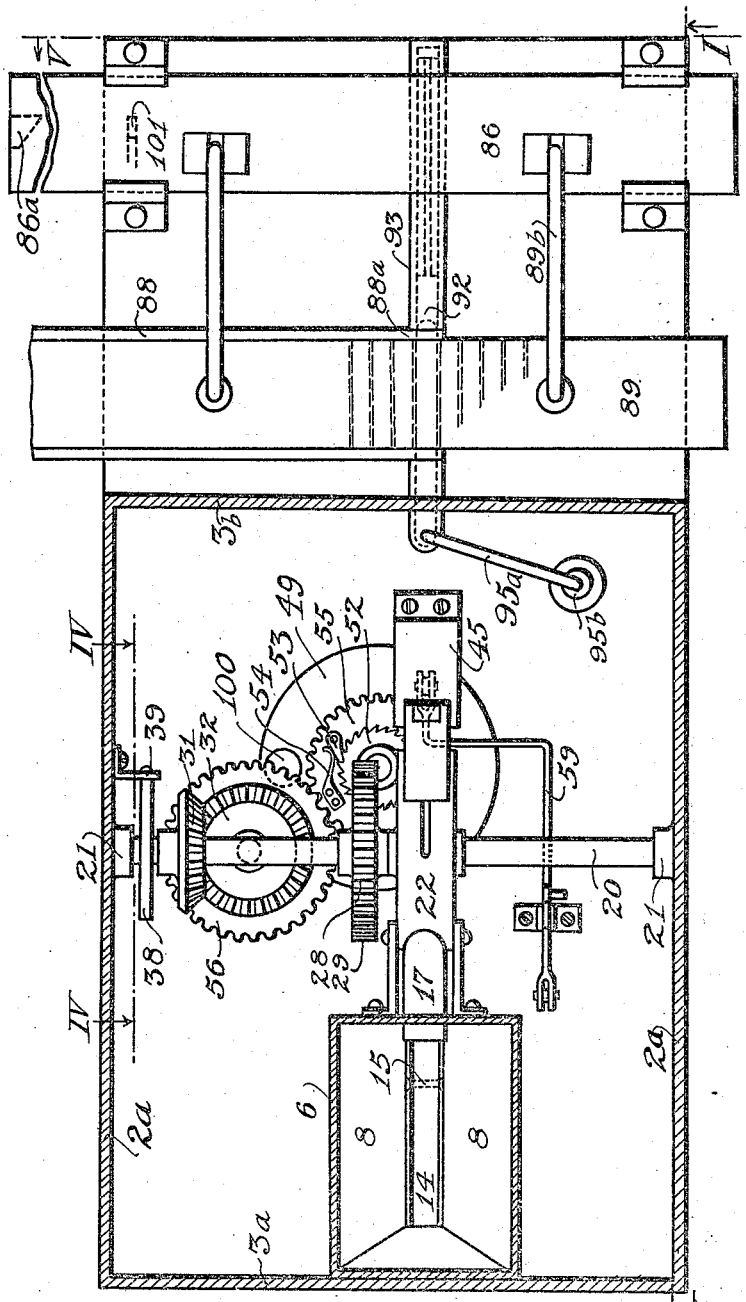
Fig. 3 is a plan view looking downward in the direction of the arrows and with the top cover removed at III—III in Fig. 1.

Referring now to the drawings in which the various parts are indicated by numerals, each numeral indicating the same part in all the views.

1 is a subbase from which sides 2 and ends 3 extend upward forming a rectangular case which is closed by a top 4 which in turn forms the main or working base for the upper portion of the machine and supports a shorter rectangular case of the same width, having sides $2^a$ and ends $3^a$, $3^b$, the end $3^a$ being in line with the end 3. This section of the case is closed with a top 5. This case is, however, incidental only to the invention and is illustrated merely as a means of correlating and supporting the various parts. 6 is a capsule hopper attached to the end $3^a$ and projecting upward through and slightly above the top 5, this hopper being adapted to hold the empty capsules, as 7, ready for distribution to the machine. This hopper has a V-shaped bottom 8 terminating in a narrow rectangular opening through which a plunger 9 reciprocates in a vertical plane. This plunger is raised by a rod 10 extending downward therefrom through a guide 11 fastened to the base 4 and bent backward at right angles then to one side and extending over to rest on a crank pin 12 formed by making a bend in the shaft 13, so that when this shaft is rotated the plunger will raise and lower once for each revolution of the shaft.

Resting on the top of the plunger 9 is a longitudinal chute 14 of the same width as the plunger, which chute is pivoted at 15 to the plunger which is cut away at 16 to permit one end of the trough to be depressed and the other end thereby raised. 17 is a fixed trough or chute near the upper end of the hopper. The plunger 9 rises, carrying with it the trough 14, to the position $9^\times$. A lug 18 on the trough engages in the position $18^\times$ the underside of the chute 17, the trough pivots about the pivot 15 in the position $15^\times$ and inclines the trough to the position $14^\times$ at which time the capsules 7 slide downward into the chute 17. These capsules will, of course, some be with the cap end, and others with the body end upward. In order that they may all be delivered cap end upward the following mechanism is provided. This mechanism comprises a tube 19 (see Figs. 1 and 6) which the capsules from the tube 17 enter one at a time. This tube is pivoted on a shaft 20 which extends up to but does not pass through same, and is journaled in bearings 21—21 fastened to or a part of the sides $2^a$, $2^a$. The tube 19 is oscillated by this shaft within a cylindrical case 22 at which the tube 17 terminates. In order to close the open end of the tube 17 during the oscillation of the tube 19, a cylindrical shutter 23 is fastened to the ends of the tube 19, which shutter slides against the inner surface of the case 22. The tube 19 has an inner diameter of the correct size to freely take the capsule, cap (larger) end first, for the full depth of the capsule, while from that point on the tube is reduced in size to just large enough to freely take the body $7^b$ of the capsule. 24 is a plunger sliding freely in the tube 19 and normally pushed toward or slightly past the center by a light spring 25, which rests at its opposite end on the closed end of the tube 19. From the plunger 24 a rod 26 extends outward through the closed end of the tube 19 and through a slot in the cylindrical case 22, but held normally by the action of the spring 25, practically flush with the outer surface of the said case. 27 is a light spring fastened at one end to the case 22 and extending inward through a slot in the said case and curving radially toward the center of same. The tube 19 is slotted at $19^a$, as is the cylindrical shutter 23 at $23^a$ to allow for the operation of this spring.

The tube 19 is rotated by a segment gear 28 meshing with a gear 29 mounted on a shaft 30, on which is also mounted a miter gear 31 meshing with a miter gear 32, mounted on a vertical shaft 33, carried by bearings 34, in the base 4. 35 is a thrust collar to hold the shaft 33 up and the miter gears 31 and 32 in mesh. 36 is a miter gear on the lower end of the shaft 33 driven by a segment gear 37 mounted on the shaft 13. 38 is a coil spring fastened at one end to shaft 20 and at the other end to a bracket 39 extending outward from the case side $2^a$. 40 is a tube normally vertical, mounted on the shaft 30 and rotated by same within the cylindrical casing 41, having openings $41^a$—$41^b$ at the top and bottom with which the tube 40 registers when in a vertical position. 42 is the slide having an opening $42^a$ also normally registering with the opening $41^b$. This slide is pivoted at 43 to a lever arm 44 which operates it and which is pivoted at $44^a$ to a bracket 45 which extends upward from the base 4. A tripping rod 46 is pivoted to the upper end of the arm 44 and extends over toward the cylindrical case 22, being supported by a guide or bearing 47 attached to the top 5 and having the end $46^a$ turned down and adapted to engage the rod 26 when same is pushed outward.

The operation is as follows,—

The shaft 13 being continuously rotated, in the direction of the arrow, Fig. 4, all the parts operated by the segmental miter gear 37 are stationary until that gear comes in mesh with the miter gear 36. During the period of the cycle when these parts are stationary the tube 19 is in register with the tube 17 and a capsule (7) moves from the tube 17 into the tube 19, the segmental gear 37 then engaging the gear 36 and acting through the shaft 33, the miter gears 31—32, the shaft 30 and the spur gears 29—28 rotates the shaft 20 and with it the tube 19 in the direction of the arrow. If the body $7^b$ of the capsule be toward the center, as shown in Fig. 6, the spring 27 will push the capsule inward causing the rod 26 to project beyond the surface of the case 22 a sufficient distance to cause it to engage the end $46^a$ of the tripping rod 46 and pull same to the left thus moving the slide 42 to the right. During this movement the tube 40 fastened to the shaft 30 has been rotating synchronously with the tube 19, the gears 28—29 being so proportioned that when the tube 19 comes into a vertical position with the end $19^a$ downward, the said end will register with and be vertically above the end $41^b$ of the tube 41, inverted. At the same time the capsule 7 will have passed the end of the spring 27 and will drop from the tube 19 into the tube 40, and the slide 42 having been moved to the right, it will be held in that tube cap end downward. A slightly farther movement of the segmental gear 37 releases the gear 36 and the spring 38 rotates the assembly to its normal position. When the tube 40 reinverts, the capsule 7 is inverted and brought cap end up and the opening $42^a$ in the slide 42 being in register drops into the tube 48. If, however, the cap end of the capsule had been inward the shoulder $19^b$ would have prevented the capsule from being pushed in by the spring 27 and consequently the rod 26 would not have been pushed outward and would not have engaged the tripping rod 46, so that the opening $42^a$ in the slide 42 would have been directly over the tube 48 and in line with the tube 40 when same was inverted, and the capsule dropping from the tube 19 would have passed through the tube 40 into the tube 48, but in that case the small end having originally been outward the capsule would have been cap end up which was as it should be.

The capsule having been dropped into the tube 48 with the body end down, drops vertically into hole 49ª in a cylindrical block 49 which is adapted to be intermittently rotated by a central shaft 50 which rotates in a bearing 51 in the base 4. This shaft carries a ratchet 52 which is adapted to be moved by a pawl 53 which is pivoted on a gear wheel 55—the pawl being held in engagement with the ratchet by a spring 54. The gear 55 meshes with and is oscillated by a gear 56 mounted on the shaft 33, the ratio of the gearing being such that one revolution of the main shaft 13 will rotate the block 49 a fractional amount equal to one revolution divided by the number of holes in the block. In this case three holes are shown for purpose of illustration and this movement is equal to one third of a revolution. The direction of rotation of the block is shown as clockwise and since the direction of rotation of the shaft 33 is the same, the direct action of the gear backs up the ratchet and the action of the spring 38 rotates the ratchet wheel 52 and the block 49. This action also synchronizes with the movement of the tube 19 since there is no movement of the block 49 until after the said tube has completed its movement, when both move simultaneously.

The block 49 having received the capsule and rotated it one-third of a revolution, it is brought over the decapper. This comprises an opening 57 in the base 4, said opening being just large enough and deep enough to take the cap 7ª of the capsule and having a shoulder 57ª against which the cap will come, the whole comprising what may be termed a cap holder. The capsule is forced into this cap holder by a plunger 58 which is depressed by a lever arm 59 pivoted at 60 in a bracket 61 fastened to and extended upward from the base 4. This lever arm 59 extends beyond the pivot point 60 and is raised by a rod 62 which extends downward through an opening in the base 4 and is raised by a tripping arm 63 which is fastened to the hub 64 keyed or otherwise fastened on the main shaft 13, thus being operated once for each revolution of the main shaft. A bell crank arm 59ª integral with the lever arm 59 extends upward at right angles and has attached at its upper end a tension spring 65, the other end of which spring is attached to the base 4, so that when the rod 62 is raised and the lever arm 59 depresses the plunger 58 the point of spring attachment to the bell crank arm passes the pivot center 60 and holds the plunger depressed. This action forces the body 7ᵇ of the capsule into a block 66 in which an opening 66ª has been formed of size adapted to receive the said capsule. Immediately preceding this action a cam 67 mounted on and rotated by the main shaft 13 has pushed an arm 68 to the right (in Fig. 1), this arm sliding in a bracket 69 attached to the lower side of the base 4, and compressed a spring 70 against said bracket. The end 68ª of the arm 68 acts against the free end of a leaf spring 71 which passes through the block 66 and is fastened to same at 71ª. This spring 71 is so shaped that it partially encircles the opening 66ª in said block and when operated by the said arm 68 is pushed clear of the said opening, and is so held while the capsule body 7ᵇ is being pushed into said opening, further movement of the cam 67 releases the arm 68 and allows the spring 71 to engage the said capsule body. During the downward movement of the capsule it acts against a plunger 72 depressing same and putting the spring 73 in tension. This spring is attached at 73ª to the block 66 and at its opposite end 73ᵇ to the plunger 72. This plunger 72 also carries at its lower end a trip lever 74 which is pivoted at 74ª to said plunger and which lever has a bell crank extension 74ᵇ to make it rigid against pressure when moving to the right, but permits it to swing freely in returning to its original position.

The capsule body having been placed and secured by the spring 71 in the block 66, the said block, which is cylindrical in form, is depressed by a collar 75 in which it is free to rotate, and is given a spiral movement by means of two spiral ribs 76ª on the interior of a carrier 76, these two ribs coacting with corresponding grooves on the outer surface of the said block 66. The collar 75 is depressed by double substantially horizontal arms 77 on which it is slidably mounted and which arms are hinged or pivoted at 77ª to the end 3 of the case. Immediately to the left of the collar 75 these arms 77 are consolidated into a single arm 77ᵇ which is bent downward at right angles and thence extended again to the left in a single arm 77ᶜ parallel to the double arms 77. This arm 77ᶜ comes beneath a cam 78 fastened on the main shaft 13 and rotated by same. This cam is so timed that it begins its action on the arm 77 immediately following the release of the spring 71 and the engagement thereby of the capsule body 7ᵇ. It depresses the arm 77ᶜ and holds it down, thereby withdrawing the capsule body 7ᵇ from the cap 7ª. As soon as this capsule body clears the cap and the base 4, a leaf spring 79 acting as a spring lever arm and carried by a collar 80 on the shaft 13 has been rotated into engagement with a lug 81ª on a rod 81 fastened to and extending outward horizontally from the carrier 76 moving same horizontally to the right in guides 82 in which said carrier is mounted, thus bringing the capsule body 7$^b$ into position immediately beneath an opening 4$^a$ in the base 4. In the meantime the cam 78 has rotated until the cut away portion 78$^a$ is passing the end of the arm 77$^c$ permitting same to be raised by tension springs 83$^a$ and 83$^b$ acting on the double portion 77 of the said arm, the opposite end of the said springs being attached to the base 4.

In passing from the position shown under the opening 57 to the opening 4$^a$ the trip lever 74 engages the beveled end 84$^a$ of a lever arm 84 which is pivoted at 84$^b$ in a bracket 85 fastened to the top of the base 4. The lever arm 84 extends through an opening 4$^b$ in the base 4 and terminates in an escapement having a fixed dog 84$^c$ and a hinged dog 84$^d$, this latter being normally in engagement with a ratchet bar 86, which bar is permitted to move when the arm 84 is moved to one side to disengage the dog 84$^d$ and at the same time to engage the dog 84$^c$ to limit the movement. The ratchet bar 86 is moved forward by means of a spring 87 which is shown as acting vertically on a cord or strap 87$^a$ which passes by a tension spring 84$^e$. On the return movement the trip lever being hinged passes over the bevel end 84$^a$ without moving same. Also if there is no capsule body in the block 66 the plunger 72 carrying the trip 74 is not depressed and the said trip passes above the bevel end 84$^a$ and does not engage same, so that no charge is placed unless there be a capsule body to receive same.

The capsule body now having been placed is ready for filling. This is accomplished as follows:—88 is a horizontally disposed V-shaped trough preferably located at right angles to the line of movement of the capsule carrier 76. 89 is a dose divider carrying a plurality of V-shaped knives 89$^a$ adapted to accurately fit the section of the trough 88. This divider is fastened to arm 89$^b$, hinged at 89$^c$ to the ratchet bar 86, and moved by the spring 87 attached to said bar. This ratchet bar 86 is mounted in guides 90 which extend upward from the base 4.

The number of knives is preferably ten or a multiple thereof, ordinarily fifty being used. The charge for a like number of capsules is first measured out or weighed and struck off level in the trough 88. This measurement may be predetermined and the trough horizontally graduated to correspond or striking off knives be made to level the charge to a predetermined depth. If a number of doses less than the total knives be wanted a false stop 91 may be used to separate the used and unused portions of the trough. This stop is preferably hollow to engage the first knife and is then moved forward by same. At one end 88$^a$ of the trough which may be denoted as the delivery end, is a plunger 92 moving in an inclosed guide 93 at right angles to the trough. This guide terminates in a closed end semi-cylindrical in shape, having a vertical axis concentric with the opening 4$^a$ in the base 4. The plunger 92 has a groove of similar shape and size adapted to form at the limit of motion in connection with the closed end of the guide a vertical cylinder immediately above the said opening. The diameter of this cylinder is slightly less than the inner diameter of the capsule body 7$^b$. The guide 93 terminates against one side of the V-shaped trough and begins again on the opposite side. When, however, the dividing knives have been moved to place a charge for a capsule they register in direct line with the sides of said guide the sides of which are the same distance apart as the knives so that the plunger 92 acts through the guides and the knives in a continuous channel,—moving the charge therein held to the left against the end of the guides and compressing same into a cylindrical shape. The said plunger is operated through a rod 92$^a$, an arm 92$^b$ pivoted at 92$^c$ to the subbase, and a second arm 92$^d$ by a cam 94 on the main shaft 13. This cam moves the plunger to the left and holds same during a portion of the revolution of the said shaft, and while so held a cylindrical plunger 95 is pushed downward moving the charge before it into the capsule body. This movement is accomplished by a U-shaped rod 95$^a$ which extends upward and then downward through a guide 95$^b$ in the base 4 and is pivoted at 95$^c$ to an arm 96, the opposite end of which encircles the shaft 13. 96$^a$ is a lug extending outward from this arm which lug is engaged by a leaf spring 97 fastened to and rotating with the shaft 13. The plunger 95 is raised by a spring 95$^d$ after the dose has been forced into the capsule and the plunger 92 is returned to its original position by a spring 92$^e$ as the cam 94 releases the end of the rod 92$^d$.

The capsule body having been thus filled, the continued rotation of the cam 78 again depresses the arm 77 lowering the capsule body out of the hole 4$^a$ and holding same depressed, the spring lever arm 79 engages a lug 81$^b$ on a U-shaped extension of the arm 81, and pushes same to the left bringing the carrier 76 and block 66 back to its starting position beneath the opening 57 in which the cap 7$^a$ is held. The cam 78 now releases the arm 77, and permits the spring 83 to raise same, thus lifting the collar 75 and with it the block 66 which block is given a spiral movement as it ascends to make the capsule body 7$^b$ more easily engage the cap 7$^a$. The cam 67 then engages the lever 68 releasing the spring 71, and permitting the spring 73 to act to raise the filled capsule and the retaining plunger 58. In addition an arm 98 pivoted at 98$^a$ is raised by a latch 98ᵇ extending upward therefrom and adapted to be engaged by a leaf spring lever 99 fastened to and rotating with the shaft 13. The end 98ᶜ of this arm engaging the bottom of the lever 74 and forcing the plunger 72 upward in case the spring 73 should fail to raise same.

When the plunger 58 is forced up the bell crank arm 59ᵃ which is held by the spring 65 is thrown past the center and the said spring then acts to raise the same.

The capsule having been brought into the block 49 and the segment gear 37 having in the meantime again engaged the miter gear 36 and rotated the shaft 33 and through the gears 31, 30, 29 and 28 put the spring 38 in torsion, now releases same and through the gears 55 and 56 and the ratchet 52 rotates the said block 49 one third of a revolution, bringing the filled capsule over a tube 100 through which it drops into a suitable receptacle, and placing another capsule ready for decapping.

When the knives 89 have reached the end of their movement, a lug 86ᵃ on the ratchet bar 86 engages an L-shaped arm 101 moving same into engagement at 101ᵃ with a stop ratchet 102 on the main shaft 13 thus stopping the further rotation of same until the ratchet bar shall have been withdrawn and the hopper 88 again have been filled.

It will, of course, be understood that many of the details hereinbefore described are typical only and that substitutions of equivalent mechanism may be made without departing from the spirit of my invention.

It will be further understood that while I have principally confined my description to a machine for measuring a powder it will readily be seen that a paste, granular, or very light and bulky substance, or in fact practically any material other than a liquid may be successfully measured and placed in capsules by my machine.

It will be especially noted that while I have shown the rod 10 as extending downward and bent backward at right angles and to one side and extending over to rest on the crank pin 12, it may extend straight backward to a crank pin between the collar 80 and the cam 78 which may be moved slightly apart for that purpose.

It will also be noted that if the trough 88 is filled full, as it ordinarily will be, and struck off level, that the top plate of the dose divider 89 will initially compress the substance therein at the same time that the knives separate same into doses.

Having fully described my invention, what I claim and desire to secure by Letters Patent of the United States is:—

1. In a machine for filling capsules, the combination with a hopper having a V-shaped bottom, a plunger adapted to be vertically reciprocated in said hopper and means for reciprocating said plunger, of a chute hinged to the top of said plunger and means for tripping said chute to discharge the capsules.

2. In a machine for filling capsules, the combination with a hopper, a plunger adapted to be vertically reciprocated in said hopper and means for reciprocating said plunger, of a chute hinged to the top of said plunger and means for tripping said chute to discharge the capsules.

3. In a machine for filling capsules, the combination with a hopper, a plunger adapted to be vertically reciprocated in said hopper and means for reciprocating said plunger, of a chute hinged intermediate its ends to the top of said plunger and a stop to engage one end of said chute, to trip the same and discharge the capsules.

4. In a machine for filling capsules, means for delivering the capsules cap end up, comprising an oscillatably mounted tube and means for oscillating said tube, said tube having one end closed, and having an inner diameter, for the depth of a capsule slightly greater than the capsule cap, and a diameter less than said cap but greater than the body of the capsule for the balance of its length, a plunger mounted in said smaller section, and having a trip rod extending through said closed end of said tube, a compression spring between said plunger and said closed end, a slot in the open end of said tube, a curved leaf spring normally passing through said slot when said tube is oscillated and adapted to force said capsule inward and cause said trip rod to protrude when the body end of said capsule is inward, a normally vertical receiving tube below said oscillating tube, means for synchronously rotating said receiving tube one-half revolution into register with the open end of said oscillating tube when said open end is downward, a slide having an opening therein normally registering with said receiving tube, and means operated by said trip rod for moving said slide to close said receiving tube when said capsule is forced inward, substantially as shown and described:

5. In a machine for filling capsules, means for delivering the capsules cap end up, comprising an oscillatably mounted tube, means for delivering capsules to said tube one at a time, said tube having one end closed, and having an inner diameter, for the depth of a capsule slightly greater than the capsule cap and a diameter less than said cap but greater than the body of the capsule for the balance of its length, a plunger mounted in said smaller section, and having a trip rod extending through said closed end of said tube, a compression spring between said plunger and said closed end, a slot in the open end of said tube, a curved leaf spring normally passing through said slot when said tube is oscillated and adapted to force said capsule inward and cause said trip rod to protrude when the body end of said capsule is inward, a normally vertical receiving tube below said oscillating tube, means for synchronously rotating said receiving tube one-half revolution into register with the open end of said oscillating tube when said open end is downward, a slide having an opening therein normally registering with said receiving tube, and means, operated by said trip rod, for moving said slide to close said receiving tube when said capsule is forced inward, substantially as shown and described.

6. In a machine of the class described, a holder for the cap and a holder for the body in alinement, means for delivering the capsule over said holders, means for placing the capsule body and cap in their respective holders and engaging same in each, means for depressing said body holder to separate said body from said cap, means for moving said body holder to bring same beneath a filling mechanism and means for filling said capsule body, means for replacing said body beneath the cap and means for recapping same.

7. In a machine of the class described, a holder for the cap and a holder for the body in alinement, means for delivering the capsule over said holders, means for placing the capsule body and cap in their respective holders and engaging same in each, means for depressing said body holder to separate said body from said cap, means for moving said body holder horizontally to bring same beneath a filling mechanism and means for filling said capsule body, means for replacing said body beneath the cap and means for recapping same.

8. In a machine of the class described, a holder for the cap and a holder for the body in alinement, means for delivering the capsule over said holders, means for placing the capsule body and cap in their respective holders and engaging same in each, means for depressing said body holder to separate said body from said cap, means for moving said body holder to bring same beneath a filling mechanism and means for raising said capsule body into engagement with said filling mechanism, means for filling said capsule body, means for returning same beneath said cap and means for reëngaging said cap.

9. In a machine of the class described, a holder for the cap and a holder for the body in alinement, means for delivering the capsule over said holders, means for placing the capsule body and cap in their respective holders, a spring adapted to engage said capsule body and hold same in said body holder, means for loosening said spring to permit the placing of said capsule body and of releasing said spring to hold said capsule body, means for depressing said body holder to separate said body from said cap, means for moving said body holder to bring same beneath a filling mechanism, means for filling said capsule body and means for returning said body holder for recapping.

10. In a machine of the class described, a holder for the cap and a holder for the body in alinement, means for delivering the capsule over said holder, a plunger adapted to force the capsule body and cap into their respective holders, means for depressing said plunger to place said capsule body and cap in their respective holders, means for holding said plunger depressed to hold said capsule cap in its holder, means for engaging said capsule body in its holder, means for depressing said body holder to separate said body from said cap, means for moving said body holder to bring same beneath a filling mechanism and means for filling said capsule body, and means for returning said body holder beneath said cap holder.

11. In a machine of the class described, means for decapping the capsule, means for moving the body from beneath the cap for filling, means for dividing the filling substance, means for compressing same into a cylindrical mass, means for forcing same into the capsules, means for replacing the body beneath the cap, and means for recapping same, substantially as shown and described.

12. In a machine for filling capsules, the combination with means for delivering capsules successively, cap end upward, of a receiving block, having a plurality of holes adapted to be synchronously rotated into position each successively to receive a capsule, a holder for the capsule cap and a holder for the capsule body in vertical alinement, means for rotating said receiving block to bring one hole in alinement with said cap and body holder, a plunger adapted to be depressed through said hole and place said capsule in said holders, and means for depressing said plunger.

13. In a machine of the class described, means for decapping the capsule, means for moving the body into position for filling, means for filling same, comprising an open end V-shaped trough containing the substance for filling, a plurality of V-shaped knives adapted to fit said trough, said knives being spaced equal distances apart to separate said substance into equal doses, a plunger guideway at one end of said trough extending on both sides thereof, one end of said guideway being closed and forming one-half of a vertical cylinder, the said guideway forming with the space between any two knives a continuous plunger guideway, a plunger having its face formed as the complementary half of a vertical cylinder mounted in said guideway, means for operating said plunger to push a dose of said substance from between said knives and compress same into a cylindrical mass for placing in the capsule body, means for placing said mass in said capsule body, means for replacing the body beneath the cap, and means for recapping same, substantially as shown and described.

14. In a machine of the class described, means for decapping the capsule, means for moving the body into position for filling, means for filling same, comprising an open end V-shaped trough containing the substance for filling, a plurality of V-shaped knives adapted to fit said trough, said knives being spaced equal distances apart to separate said substance into equal doses, means for advancing said knives in said trough to move said doses forward, a plunger guideway at one end of said trough extending on both sides thereof, one end of said guideway being closed and forming one-half of a vertical cylinder, the said guideway forming with the space between any two knives a continuous plunger guideway, a plunger having its face formed as the complementary half of a vertical cylinder mounted in said guideway, means for operating said plunger to push a dose of said substance from between said knives and compress same into a cylindrical mass for placing in the capsule body, means for placing said mass in said capsule body, means for replacing the body beneath the cap, and means for recapping same, substantially as shown and described.

15. In a machine of the class described,— means for decapping the capsule, means for moving the body into position for filling, means for filling same, comprising an open end V-shaped trough containing the substance for filling, a plurality of V-shaped knives adapted to fit said trough, said knives being spaced equal distances apart to separate said substance into equal doses, a plunger guideway at one end of said trough extending on both sides thereof, one end of said guideway being closed and forming one half of a vertical cylinder, the said guideway forming with the space between any two knives a continuous plunger guideway, a rack attached to said knives, and means for advancing said rack and knives with a step by step movement to bring the knives successively into register with the sides of the guideway, a plunger, having its face formed as the complementary half of a vertical cylinder, mounted in said guideway, means for operating said plunger to push a dose of said substance from between said knives and compress same into a cylindrical mass for placing in the capsule body, means for placing said mass in said capsule body, means for replacing the body beneath the cap, and means for recapping same, substantially as shown and described.

16. In a machine of the class described,— means for decapping the capsule, means for moving the body into position for filling, means for filling same, comprising an open end V-shaped trough containing the substance for filling, a plurality of V-shaped knives adapted to fit said trough, said knives being spaced equal distances apart to separate said substance into equal doses, a rack attached to said knives, a spring attached to said rack to move same forward and an escapement to allow the rack to advance said knives and move the doses forward, a plunger guideway at one end of said trough, extending on both sides thereof, one end of said guideway being closed and forming one-half of a vertical cylinder, the said guideway forming with the space between any two knives a continuous plunger guideway, a plunger, having its face formed as the complementary half of a vertical cylinder, mounted in said guideway, and means for operating said plunger to push a dose of said substance from between said knives and compress same into a cylindrical mass for placing in the capsule body, means for placing said mass in said capsule body, means for replacing the body beneath the cap, and means for recapping same, substantially as shown and described.

17. In a machine of the class described,— means for decapping the capsule, means for moving the body into position for filling, means for filling same, comprising an open end V-shaped trough containing the substance for filling, a plurality of V-shaped knives adapted to fit said trough, said knives being spaced equal distances apart to separate said substance into equal doses, a plunger guideway at one end of said trough extending on both sides thereof, one end of said guideway being closed and forming one-half of a vertical cylinder, the said guideway forming with the space between any two knives a continuous plunger guideway, a plunger having its face formed as the complementary half of a vertical cylinder mounted in said guideway, means for operating said plunger to push a dose of said substance from between said knives and compress same into a cylindrical mass for placing in the capsule body, a plunger adapted to be depressed through the cylinder formed by said plunger and guideway, means for depressing said plunger to place said mass in said capsule body, means for replacing the body beneath the cap, and means for recapping same, substantially as shown and described.

18. In a machine of the class described, means for placing the capsule body in position for filling, means for filling same, comprising a container for holding the filling substance, means for dividing said substance into equal doses, means for moving a dose into position over said capsule body, and means for placing said dose in said capsule body.

19. In a machine of the class described, means for placing the capsule body in position for filling, means for filling same, comprising a container for holding the filling substance, means for dividing said substance into equal doses, means for moving a dose into position over said capsule body and compressing same, and means for placing said dose in said capsule body.

20. In a machine of the class described, means for placing the capsule body in position for filling, means for filling same, comprising a container holding the substance for filling, means for dividing the substance into equal doses, means for advancing the doses in said holder, means for moving a dose of said substance from said container over said capsule body and compressing same, and means for placing said dose in said capsule body.

21. In a machine of the class described, means for placing the capsule body in position for filling, means for filling same, comprising a container for holding the substance for filling, means for dividing the substance into equal doses, means for advancing the doses in said container, means for moving a dose of said substance from said container over said capsule body and compressing same into a cylindrical mass for placing in the capsule body, and means for placing said mass in said capsule body.

22. In a machine of the class described, means for decapping the capsule, means for moving the body into position for filling, means for filling same, comprising an open end V-shaped trough containing the substance for filling, a plurality of V-shaped knives adapted to fit said trough, said knives being spaced equal distances apart to separate said substance into equal doses, a plunger guideway at one end of said trough extending on both sides thereof, one end of said guideway being closed, the said guideway forming with the space between any two knives a continuous plunger guideway, a plunger mounted in said guideway, means for operating said plunger to push a dose of said substance from between said knives and over said capsule body, a plunger in vertical alinement over said capsule body, and means for depressing said plunger to place said mass in said capsule body, substantially as shown and described.

In testimony whereof I have hereunto set my name.

OSCAR M. TAYLOR.

Witnesses:
 HORACE H. HALL,
 O. H. PAYNE.

Copies of this patent may be obtained for five cents each, by addressing the "Commissioner of Patents, Washington, D. C."